United States Patent
Edelman et al.

(10) Patent No.: US 9,714,130 B1
(45) Date of Patent: Jul. 25, 2017

(54) BEVERAGE CONTAINER LID WITH INTEGRAL SNACK PACKAGING AND EJECTION FEATURE

(71) Applicants: Ron Edelman, Ashdod (IL); Shahar Turgeman, Boca Raton, FL (US)

(72) Inventors: Ron Edelman, Ashdod (IL); Shahar Turgeman, Boca Raton, FL (US)

(*) Notice: Subject to any disclaimer, the term of this patent is extended or adjusted under 35 U.S.C. 154(b) by 98 days.

(21) Appl. No.: 14/834,496

(22) Filed: Aug. 25, 2015

Related U.S. Application Data

(62) Division of application No. 14/459,264, filed on Aug. 13, 2014, now Pat. No. 9,114,920.

(51) Int. Cl.
  *B65D 83/04* (2006.01)
  *A47G 19/22* (2006.01)
  *B65D 51/28* (2006.01)
  *A21D 17/00* (2006.01)
  *A23L 2/56* (2006.01)

(52) U.S. Cl.
  CPC ......... *B65D 83/049* (2013.01); *A21D 17/008* (2013.01); *A23L 2/56* (2013.01); *A47G 19/2272* (2013.01); *B65D 51/28* (2013.01); *B65D 51/2814* (2013.01); *A23V 2002/00* (2013.01)

(58) Field of Classification Search
  CPC .... B65D 83/49; B65D 51/28; B65D 51/2814; B65D 43/21; A47G 19/2272; A21D 17/008; A23L 2/56
  See application file for complete search history.

(56) References Cited

U.S. PATENT DOCUMENTS

| | | |
|---|---|---|
| 3,163,311 A | 12/1964 | Stolk |
| 4,911,320 A | 3/1990 | Howes |
| 5,099,232 A | 3/1992 | Howes |
| 5,117,995 A * | 6/1992 | Kau ................. B65D 39/00 116/281 |
| 5,524,788 A | 6/1996 | Plester |
| 6,311,860 B1 | 11/2001 | Reidinger et al. |
| 7,100,787 B2 | 9/2006 | Farnsworth et al. |
| 8,381,935 B1 | 2/2013 | Buck |
| 2005/0178677 A1 | 8/2005 | Morrow |
| 2009/0206089 A1 | 8/2009 | Mueller |
| 2010/0012193 A1 | 1/2010 | Anson et al. |
| 2011/0198355 A1 | 8/2011 | Mullen |
| 2011/0248033 A1 | 10/2011 | Mehrvijeh |

* cited by examiner

*Primary Examiner* — Erik Kashnikow
*Assistant Examiner* — Chaim Smith
(74) *Attorney, Agent, or Firm* — Allen D. Hertz, P.A.; Allen D. Hertz

(57) ABSTRACT

A beverage and snack consumption enhancing lid. The lid includes at least one of a snack receiving receptacle and at least one beverage flavoring capsule receptacle. A snack ejector is installed or integrated into the snack receiving receptacle. A snack is packaged within the snack receiving receptacle and retained therein by a snack cover. A beverage flavoring capsule is placed in each at least one beverage flavoring capsule receptacle and retained therein by a seal. The snack cover can multi-function as the capsule seal. The snack ejector would raise the snack from the snack receptacle when the cover is opened. The capsule can be compressed against a piercing element integrated into the capsule receptacle. Flavoring from within the capsule would be dispensed into the beverage to enhance the beverage flavor.

19 Claims, 13 Drawing Sheets

BEVERAGE CONTAINER LID WITH INTEGRAL SNACK PACKAGING AND EJECTION FEATURE

CROSS-REFERENCE TO RELATED APPLICATION

This Non-Provisional Utility Patent Application is a Divisional Patent Application claiming the benefit of U.S. Non-Provisional patent application Ser. No. 14/459,264 filed on Aug. 13, 2014, which is incorporated herein in its entirety.

FIELD OF THE INVENTION

The present invention relates to the field of beverage containers. In particular, the present invention relates to a beverage container lid comprising features for enhancing distribution of beverage related goods, including a receptacle for storing and distributing snacks and/or a series of flavoring tablet storage and dispensing cavities.

BACKGROUND OF THE INVENTION

Beverage containers are provided in a variety of form factors. Each beverage container is designed based upon the desired function. Bottling companies utilize sealed glass, plastic, or metal beverage containers for bottling or canning beverages. These containers are selected based upon their shipping support, longevity of product shelf life, cost, and appeal to the consumer. These containers are suitable for retaining their shape during exposure to the hardships of transportation, storage, and handling through manufacturing, bottling/canning, distribution from the bottling/canning company to the distributor, from the distributor to the merchant, and placement on a shelf, within a vending machine, or any other point of sales arrangement.

Other containers are designed for receipt of dispensed beverages on site, such as fountain drinks, hot beverages (coffee, tea, latte, hot chocolate, etc.), alcoholic beverages, and the like. Beverages dispensed on site are placed into glasses, cups, and the like. The consumer may employ a lid to cover the cup for any number of reasons, such as minimize any risk for spilling the beverage, maintaining a temperature of the beverage (warm or cold), minimize any potential of unwanted elements falling into the beverage (dust, insects, etc.), an indication of what beverage was dispensed into the container, and the like.

Coffee shops, delis, bakeries, and other merchants commonly offer hot beverages and snacks, such as pastries, cakes, donuts, brownies, cookies, and the like. Flavoring options for the beverage are dispensed into the beverage by either the merchant or made available by the merchant for dispensing into the beverage by the consumer.

Thus, there presently exists a need for enhancements in beverage container lids to enhance the consumer's snack experience.

BRIEF SUMMARY OF THE INVENTION

The present invention provides a beverage container lid containing consumption experience enhancing features.

In one embodiment, the present invention is directed towards a beverage container lid comprising:

a beverage covering segment having a cup rim receiving sidewall extending downward from a peripheral edge of the covering segment, wherein the cup rim receiving sidewall is designed to removeably engage with a rim of a cup;

a snack receiving receptacle formed within the beverage covering segment;

a snack receptacle cover detachably secured to a snack receiving ledge formed on the beverage covering segment extending about the snack receiving receptacle.

In a second aspect, the beverage container lid further comprises a drink dispensing section, preferably formed extending upward from the snack cover receiving ledge.

In another aspect, the beverage container lid is manufactured having a unitary construction.

In yet another aspect, the beverage container lid further comprises a snack ejector integrated into a base portion of the snack receiving receptacle.

In yet another aspect, the snack ejector is formed as a compression cantilever spring.

In yet another aspect, the snack ejector is provided as a biasing element retained in a compressed configuration by a combination of the snack and the snack receptacle cover.

In yet another aspect, the snack ejector is formed as a unitary element of the beverage container lid.

In yet another aspect, the snack ejector is formed as a section cut from the beverage container lid and formed into a cantilevered spring.

In yet another aspect, the snack receptacle cover is adhesively secured to the beverage container lid, preferably to the snack cover receiving ledge.

In yet another aspect, the snack receiving receptacle can further comprise a series of small perforations enabling moisture from a hot beverage to permeate the snack.

In yet another aspect, the cup rim receiving sidewall further comprises a rim anti-leak feature. The rim anti-leak feature can be provided in a form of an inwardly extending flange circumscribing an interior of a rim receiving formation of the cup rim receiving sidewall.

In yet another aspect, a rim receiving formation of the cup rim receiving sidewall is formed having a shape to snap onto the cup rim.

In yet another aspect, the cup rim receiving sidewall further comprising a flared lead-in section. The flared lead-in section is preferably integrally formed at a distal end of the cup rim receiving sidewall.

In yet another aspect, the snack containing lid assembly further comprises an indicator to identify what snack is placed within the snack receiving receptacle. The indicator can be a press in boss, a removable label, a marking, rotating an indicator on the snack receptacle cover to align with an associated marking on the lid, and the like.

In a second embodiment, the present invention is directed towards a beverage container lid comprising:

a beverage covering segment having a cup rim receiving sidewall extending downward from a peripheral edge of the covering segment, wherein the cup rim receiving sidewall is designed to removeably engage with a rim of a cup;

a beverage flavoring capsule receptacle formed within the beverage covering segment;

a beverage flavoring capsule receptacle cover detachably secured to a cover receiving ledge formed on the beverage covering segment extending about the beverage flavoring capsule receptacle.

In yet another aspect, the beverage flavoring capsule receptacle further comprises a beverage flavoring capsule piercing element. The piercing element can be configured to include a piercing tip. A beverage flavoring composition dispensing orifice can be formed through a center of the beverage flavoring capsule piercing element, through an outer portion of the beverage flavoring capsule piercing element, or both.

In yet another aspect, the snack containing lid assembly can include an indicator to identify what beverage flavoring tablet is placed within the beverage flavoring tablet receiving receptacle. The indicator can be a press in boss, a removable label, a marking, rotating an indicator on the beverage flavoring tablet receptacle cover to align with an associated marking on the lid, and the like.

In yet another aspect, the snack containing lid assembly can include a plurality of beverage flavoring capsule receptacles, providing for a selection of different flavorings for the consumer to select from.

In yet another aspect, the beverage flavoring capsules can be provided having any of a variety of flavors. The flavoring would preferably be provided as a syrup. Examples of flavors include: a sweetener, vanilla, French vanilla, cinnamon, hazel nut, chocolate, cream, Irish cream, mint, pumpkin, spice, peppermint, caramel, butterscotch, Kaluha, Amaretto, rum, marshmallow, flavored rum, toffee, almond, and the like. The beverage flavoring can additionally of a composition that is sugar free.

In yet another aspect, beverage flavoring capsules can be fabricated of a capsule material that is able to withstand elevated temperatures emitted by the hot beverage dispensed into the container.

In yet another aspect, beverage flavoring capsules can be brittle, enabling easy fracturing when compressed against the piercing element.

In yet another aspect, beverage flavoring capsules can be of a gel cap material, enabling easy fracturing when compressed against the piercing element, while retaining some flexibility to minimize unwanted damage prior to use.

In yet another aspect, beverage flavoring capsules can be fabricated of a capsule material that melts when exposed to elevated temperatures emitted by the hot beverage dispensed into the container. The capsule material would melt, dispensing the encased beverage flavoring through the orifice into the beverage residing within the container.

In yet another aspect, the beverage flavoring capsule feature and the snack storage feature can be used independently of one another or combined into a single, multi-feature beverage lid.

In use, the snack can be warmed or even partially cooked by the heat emitted from a warm or hot beverage residing within the container.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE INVENTION

Figure 1:
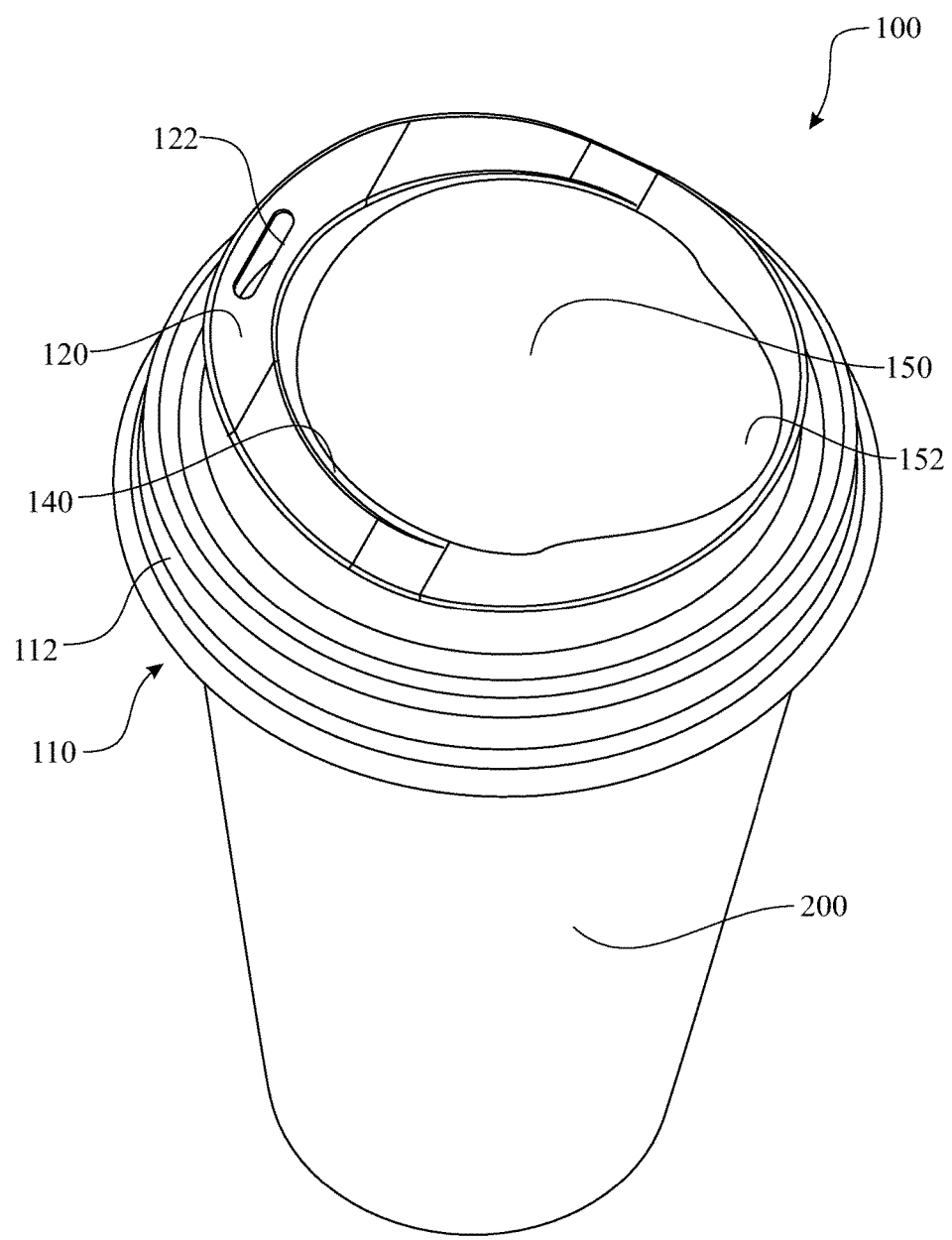
FIG. 1 presents an isometric top view of an exemplary consumer's snack experience enhancing lid attached to a beverage container.
Figure 2:
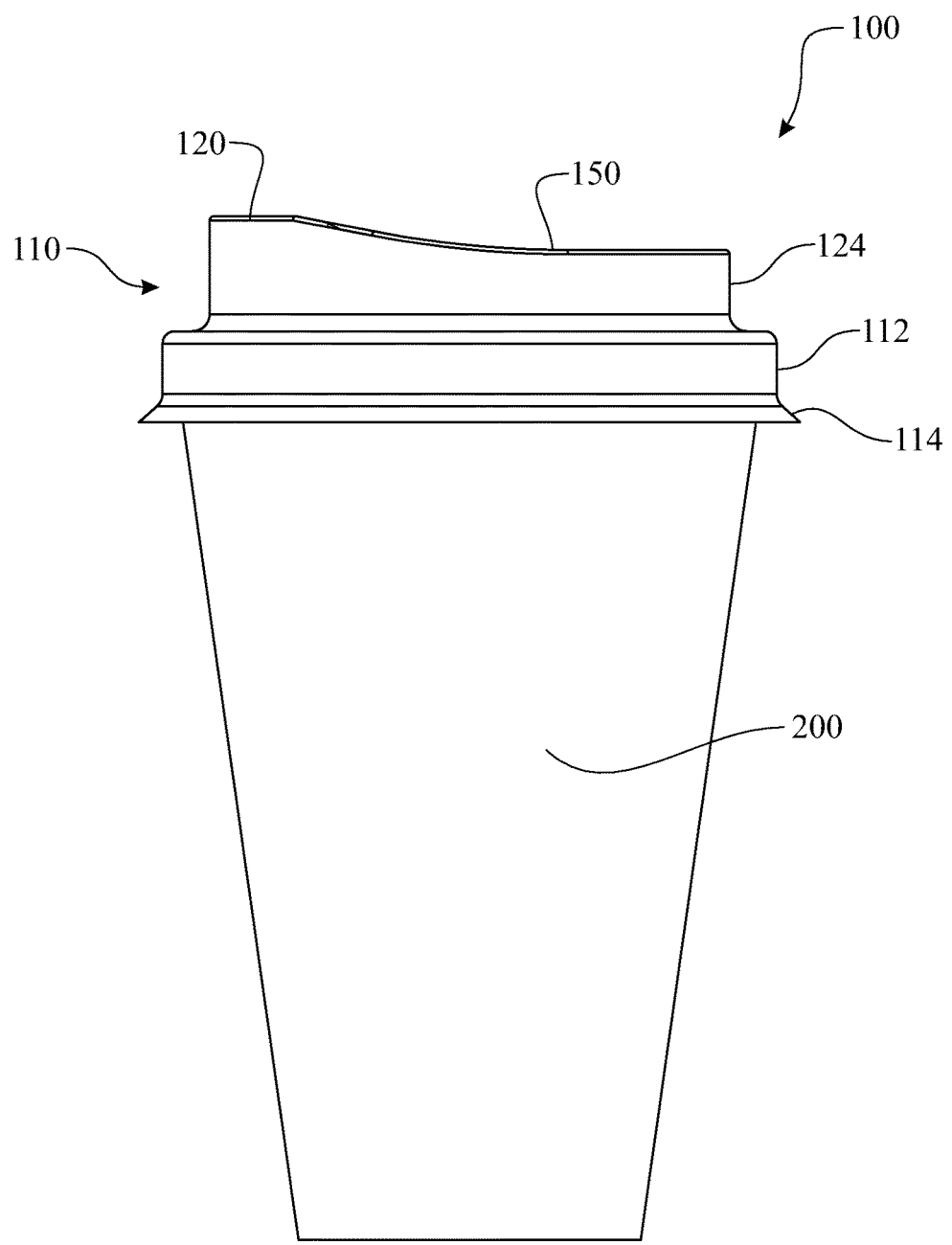
FIG. 2 presents an elevation side view of the consumer's snack experience enhancing lid attached to a beverage container originally introduced in FIG. 1.
Figure 3:
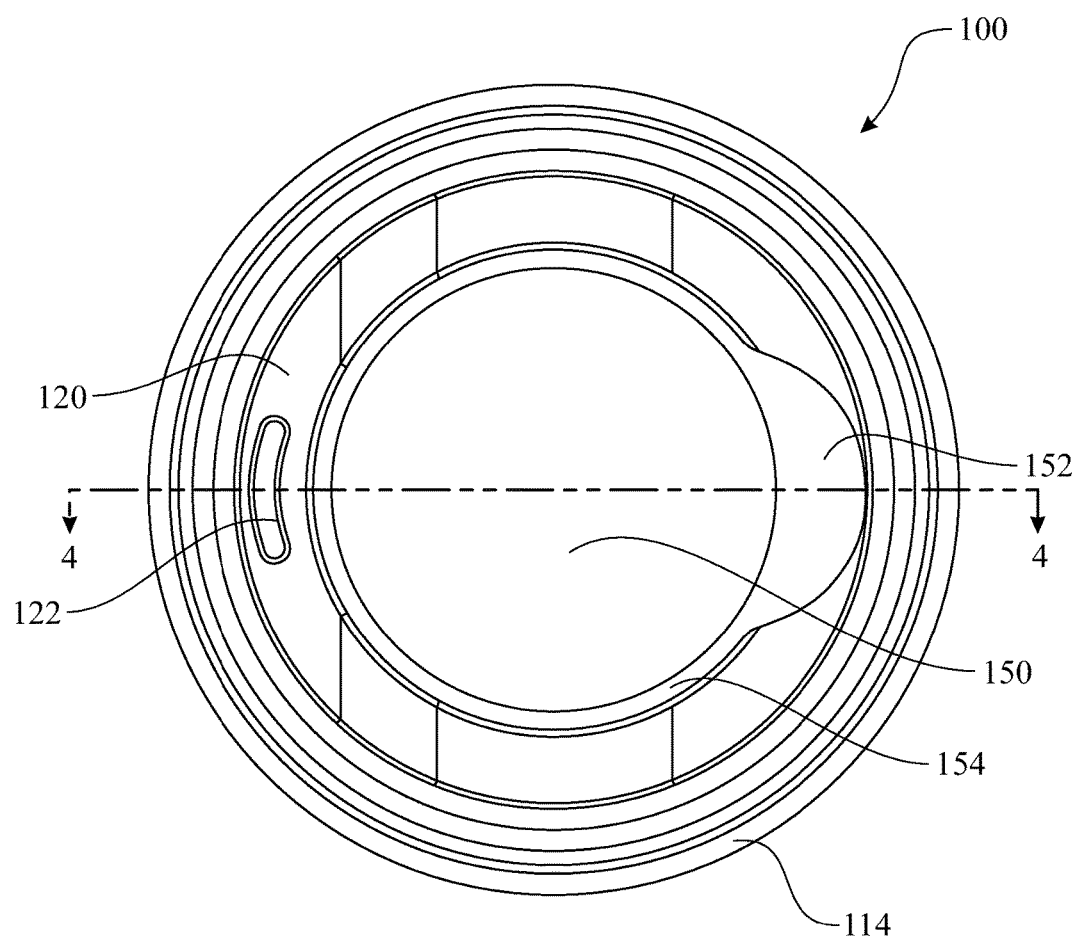
FIG. 3 presents a top view of the consumer's snack experience enhancing lid originally introduced in FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. In other implementations, well-known features and methods have not been described in detail so as not to obscure the invention. For purposes of description herein, the terms "upper", "lower", "left", "right", "front", "back", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments that may be disclosed herein are not to be considered as limiting, unless the claims expressly state otherwise.

Figure 4:
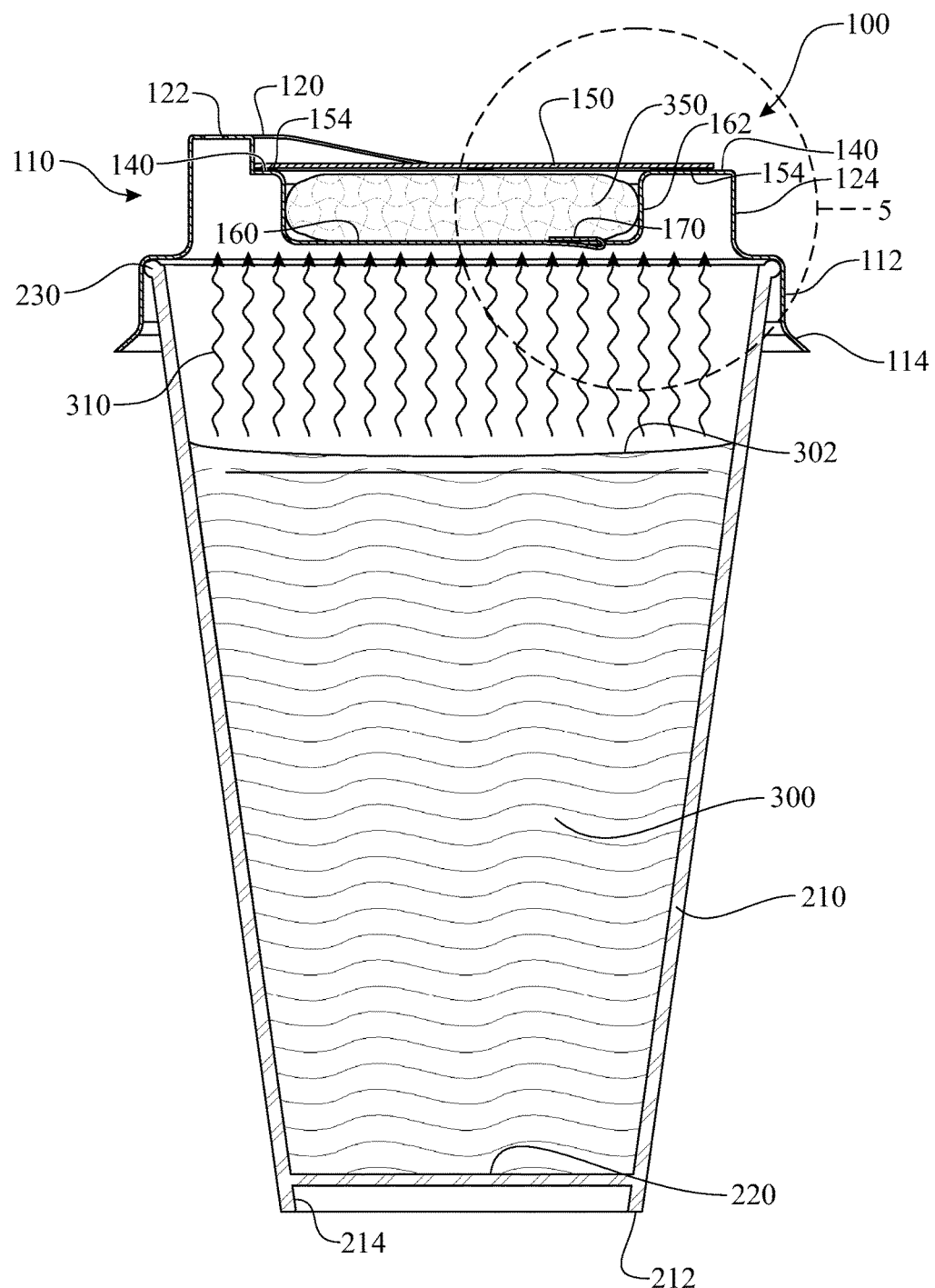
FIG. 4 presents a sectioned side view of the consumer's snack experience enhancing lid attached to a beverage container originally introduced in FIG. 1, introducing a snack packaged within a snack receiving receptacle shown in a contained configuration.

The present invention comprises a snack containing cup assembly 100 for enhancing a consumer's refreshments experience, as illustrated in FIGS. 1 through 7. The term refreshments refers to consumption of both snacks and beverages. A snack containing lid assembly 110 is removably secured to a beverage cup 200 to help retain a beverage 300 within the beverage cup 200 during transport and consumption. The beverage cup 200 is any commonly available beverage cup comprising a beverage cup sidewall 210 extending between a beverage cup sidewall base end 212 and a beverage cup rolled upper rim 230 in a conical frustum shape. A beverage cup bottom panel 220 is adhered to a lower end of the beverage cup sidewall 210. The beverage cup sidewall 210 can be aligned with the beverage cup sidewall base end 212 or slightly elevated defining a beverage cup sidewall base gap 214 between the beverage cup sidewall base end 212 and a lower surface of the beverage cup bottom panel 220. The beverage cup sidewall 210 and beverage cup bottom panel 220 collectively define a beverage container or beverage receptacle 240 for receiving and retaining the beverage 300, as best shown in FIG. 4. The snack containing lid assembly 110 includes an upper generally horizontal surface referred to as a beverage covering segment. A cup rim receiving sidewall 112 extends downward from a peripheral edge of the beverage covering segment. A lid skirt 114 can be shaped into a distal end of the cup rim receiving sidewall 112, wherein the lid skirt 114 provides a lead-in for quick attachment of the snack containing lid assembly 110 to the beverage cup 200. The outward shape of the lid skirt 114 also enhances structural rigidity of the cup rim receiving sidewall 112. A beverage container rim retention feature 130 (FIG. 5) is shaped between the beverage covering segment and the cup rim receiving sidewall 112. The beverage container rim retention feature 130 is designed to removeably engage with the beverage cup rolled upper rim 230 of the beverage cup 200. The beverage cup 200 would be fabricated of a material or selection of materials based upon the type and temperature of a beverage 300 anticipated to be dispensed into the beverage cup 200. The beverage cup 200 can be fabricated of a wax covered paper, plastic, and the like for beverages 300 that are served at room temperature or chilled. The beverage cup 200 can be fabricated of a wax covered heavy paper or cardboard, foam, and the like for beverages 300 that are served at an elevated temperature. A volume of the beverage 300 is dispensed into the beverage receptacle 240 defined by the beverage cup 200. The volume of the beverage 300 would be less than a maximum volume of the beverage receptacle 240 defined by the beverage cup 200. An exposed upper surface of the beverage 300 is referred to as a beverage upper surface 302. A warm or hot beverage 300 would emit an emitted heat 310.

The beverage covering segment of the snack containing lid assembly 110 is formed to define a number of features. A beverage lid riser wall 124 elevates the beverage covering segment from the beverage cup rolled upper rim 230. A drink dispensing section 120 is formed along a portion of a circumference of the beverage covering segment. The drink dispensing section 120 is preferably formed having an angled or ramped semi-circular "U" shaped section. The semi-circular "U" shaped section defining the drink dispensing section 120 is bound by an outer circular circumference and an inner circular circumference. The design of the drink dispensing section 120 directs the beverage 300 towards a drink dispensing orifice 122 provided through a central region of the drink dispensing section 120 proximate an apex of the semi-circular "U" shaped section. The beverage 300 would pass through the drink dispensing orifice 122 for consumption by the consumer. The drink dispensing section 120, and more specifically, the drink dispensing orifice 122 is located distally from the beverage container rim retention feature 130 to separate the dispensing location from the beverage cup 200. This distance separates the consumer's lips from the heat emitted from the beverage and transferred to the beverage cup 200, thus reducing the risk of getting burned. The snack containing lid assembly 110 is commonly fabricated of a material that is less thermally conductive than the material of the beverage cup 200.

A snack receiving receptacle is formed as a recession within the beverage covering segment of the snack containing lid assembly 110. The snack receiving receptacle includes a snack receiving receptacle sidewall 162 extending upward or generally axially from a circumferential edge of a snack receiving receptacle base panel 160, terminating at a snack cover receiving ledge 140. The snack cover receiving ledge 140 extends radially outward from an upward edge of the snack receiving receptacle sidewall 162. The snack cover receiving ledge 140 would preferably extend radially outward to the inner circular circumference of the drink dispensing section 120. The snack receiving receptacle base panel 160 is preferably circular in shape. The circular shape of the snack receiving receptacle base panel 160 in combination of the snack receiving receptacle sidewall 162 defines a cylindrically shaped snack receiving receptacle. The dimensions of the snack receiving receptacle would be based upon like dimensions of a snack or series of snacks that will be packaged within the snack receiving receptacle. The snack receiving receptacle can be centrally located or offset in a direction away from the drink dispensing orifice 122.

Figure 5:
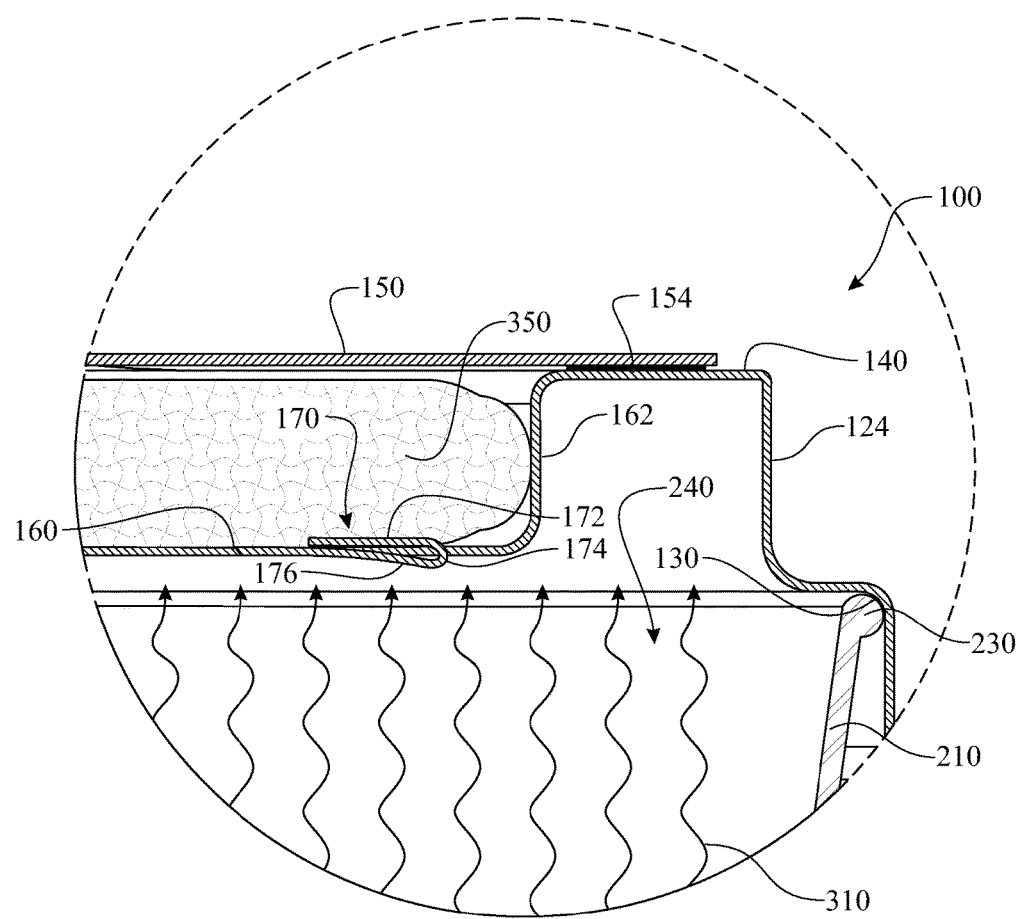
FIG. 5 presents a magnified section view detailing a snack ejector and other related features of the consumer's snack experience enhancing lid.
Figure 6:
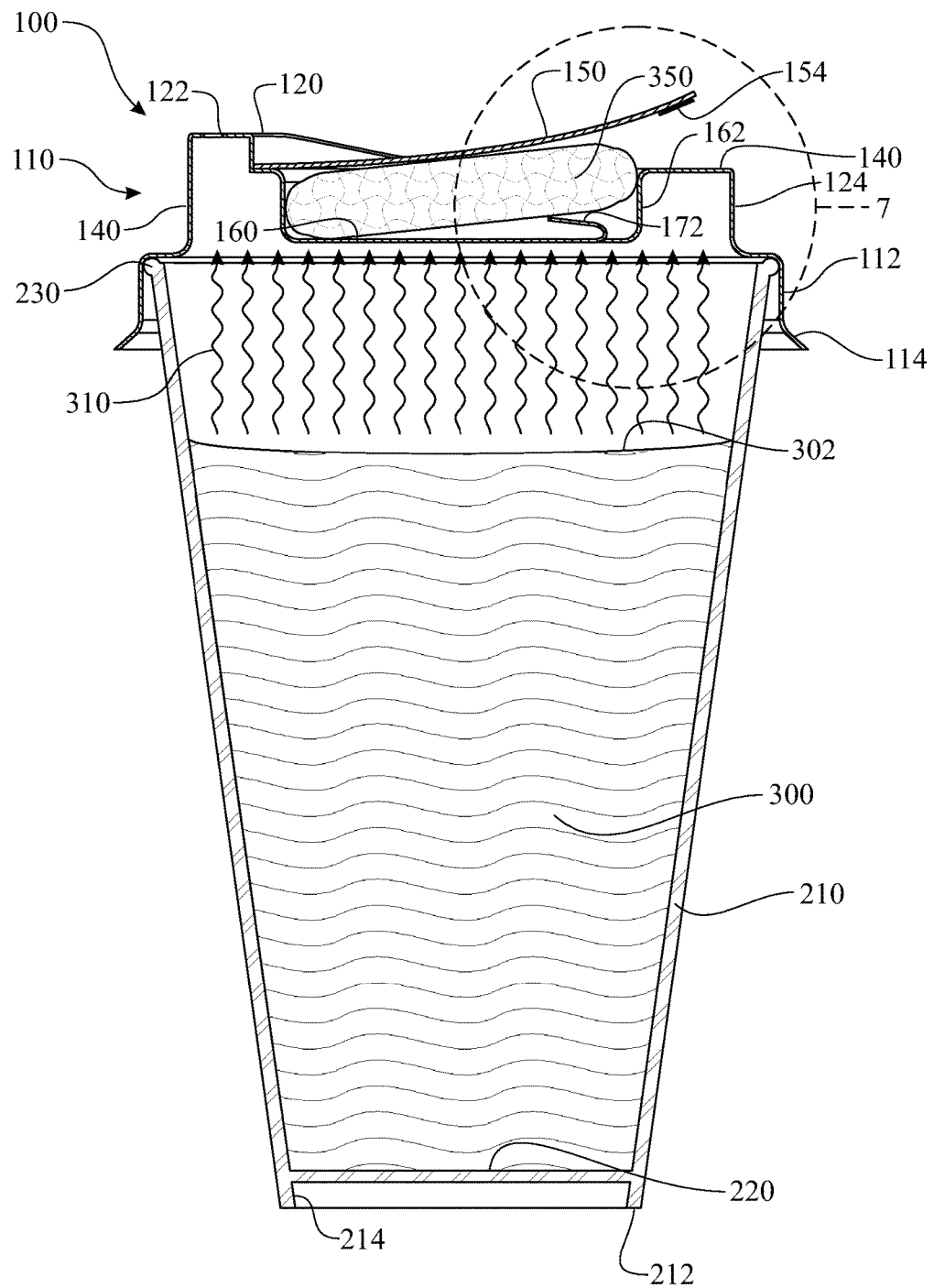
FIG. 6 presents a sectioned side view of the consumer's snack experience enhancing lid attached to a beverage container originally introduced in FIG. 1, illustrating a snack access and ejection process.

A snack 350 is placed within the snack receiving receptacle for distribution. The snack 350 can be partially or completely prepared. When the beverage 300 is hot, the emitted heat 310 from the beverage 300 can be used to warm or even finish preparing the snack 350. A snack receptacle cover 150 can be removably attached to the snack containing lid assembly 110. The snack receptacle cover 150 can include a snack cover retrieval tab 152 to aid in removal from the snack containing lid assembly 110. In the exemplary embodiment, the snack receptacle cover 150 is attached to the snack cover receiving ledge 140 using a snack cover adhesive 154 as illustrated in FIG. 5. The snack cover receiving ledge 140 preferably circumscribes the snack receiving receptacle sidewall 162, providing a complete seal about the snack receiving receptacle. The snack ejector feature 170 can be formed as a cantilevered spring. The snack ejector feature 170 can be segmented into a snack ejector arm 172, a snack ejector biasing feature 174 and a snack ejector retraction feature 176. The snack ejector retraction feature 176 would be compressed below a plane of the snack receiving receptacle base panel 160 when the snack 350 is placed thereon and sealed within the snack receiving receptacle by the snack receptacle cover 150. The snack ejector arm 172 would be flexed against the snack ejector retraction feature 176 by elastically bending the snack ejector biasing feature 174. The snack ejector biasing feature 174 generates a spring force. The compression of the snack ejector arm 172 caused by the snack 350 and the snack receptacle cover 150 introduces a potential energy into the snack ejector feature 170. When the snack receptacle cover 150 is at least partially separated from the snack cover receiving ledge 140, the compressed spring energy stored within the snack ejector feature 170 is released ejecting the snack 350 from the snack receiving receptacle, as illustrated in FIG. 7.

In one variant, the snack receiving receptacle can include at least one aperture for passing moisture from the beverage cup 200 into the snack receiving receptacle. In the exemplary embodiment, the formation of the snack ejector feature 170 also creates a passageway from the beverage cup 200 into the snack receiving receptacle. The passageway enables passing of moisture from the beverage 300 to the snack 350. Alternatively, the snack receiving receptacle base panel 160 can be perforated to provide the same function.

Although the exemplary snack ejector feature 170 is shown as a cantilevered design, it is understood that the snack ejector feature 170 can be designed in any suitable shape. The snack ejector feature 170 can be integrally formed within the snack receiving receptacle base panel 160 as illustrated in the exemplary embodiment, or provided as a separate element inserted into the snack receiving receptacle. By using a snack ejector feature 170 as a separate element, the two-piece configuration enables the snack 350 to be sealed within the snack receiving receptacle. The snack ejector feature 170 can be formed as a button and inserted into the snack receiving receptacle, resting upon an upper surface of the snack receiving receptacle base panel 160. The button would be compressed when the snack 350 is packaged within the snack receiving receptacle. The elasticity of the compression would eject the snack 350 when the snack receptacle cover 150 is detached from the snack cover receiving ledge 140. In yet another embodiment, the snack ejector feature 170 can be designed as an arched strip, wherein the two ends of the arch would be positioned against opposite ends or tangents of the snack receiving receptacle sidewall 162.

Figure 7:
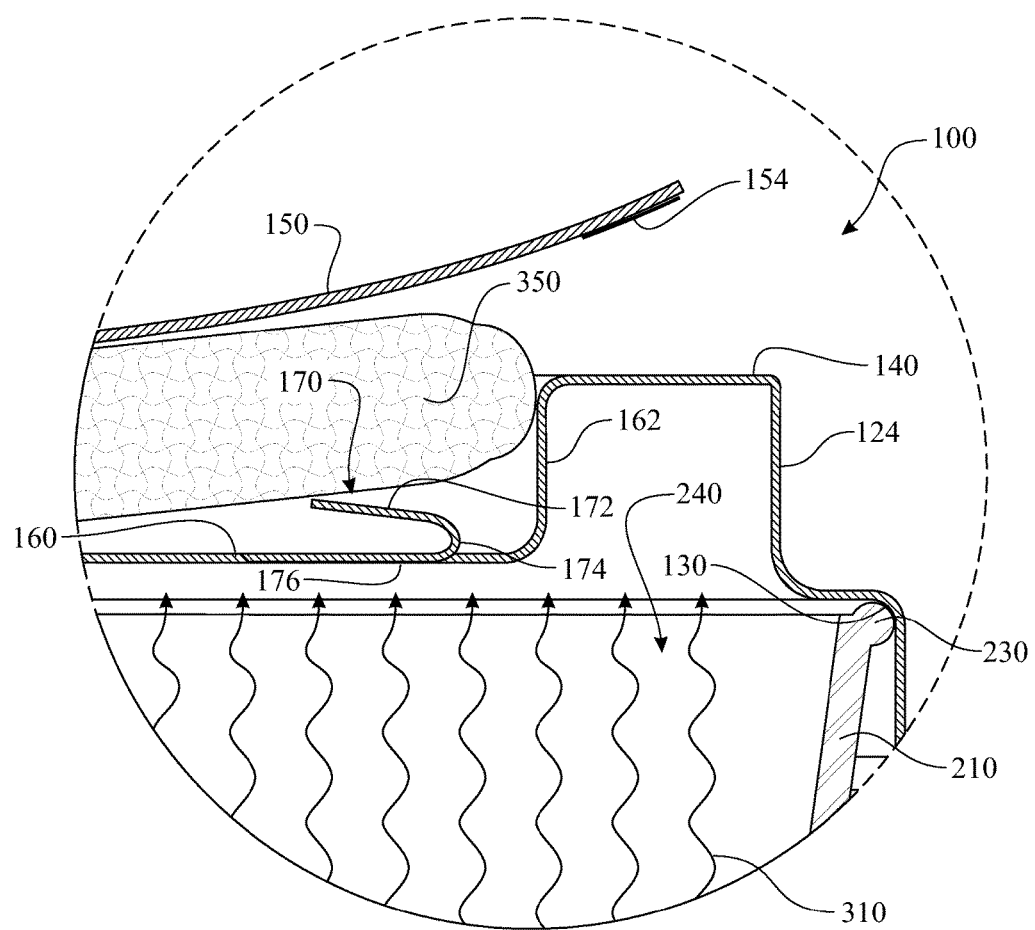
FIG. 7 presents a magnified sectioned side view detailing the snack access and ejection process of FIG. 6.
Figure 8:
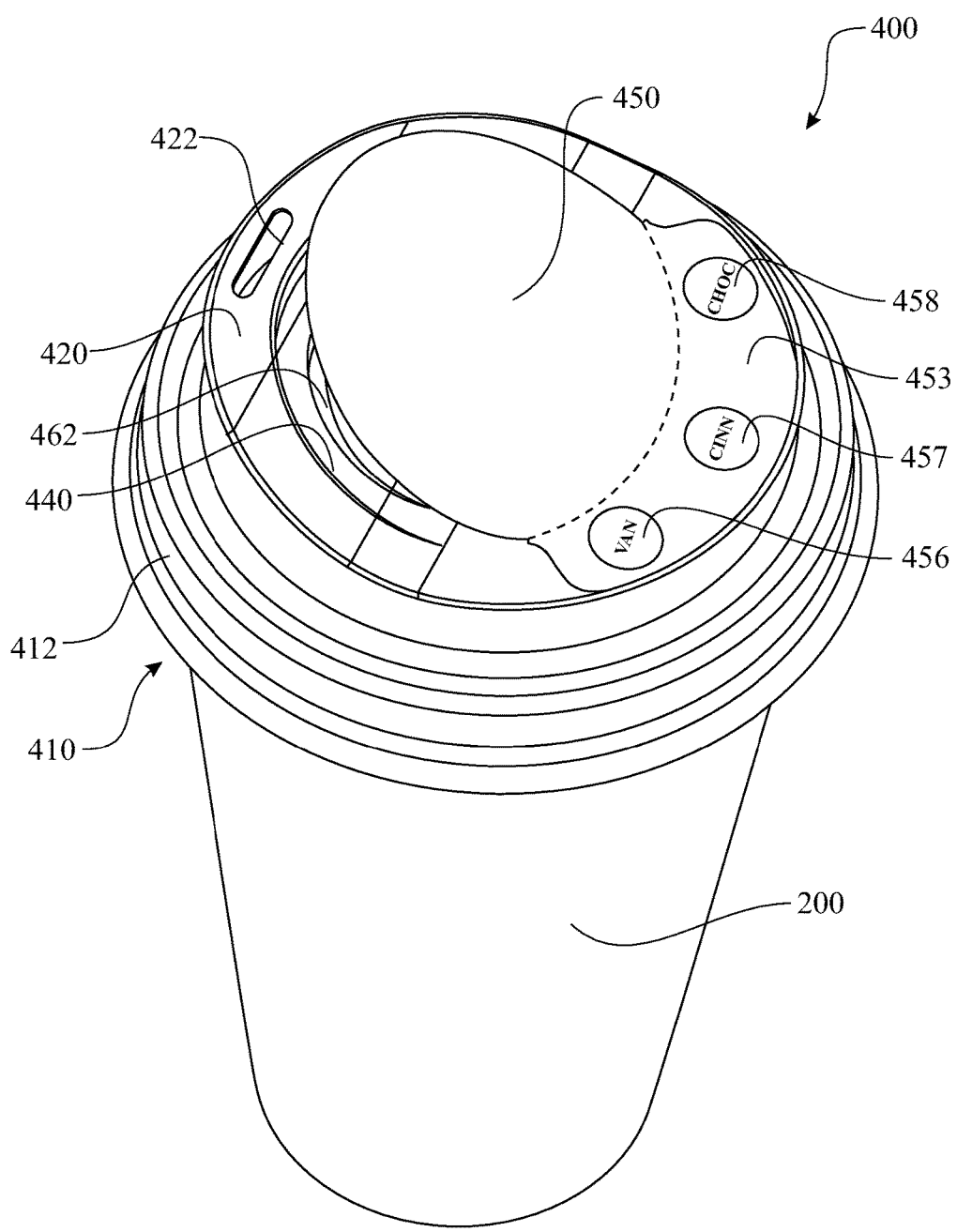
FIG. 8 presents an isometric view of a consumer's snack experience enhancing lid attached to a beverage container, wherein the consumer's snack experience enhancing lid includes a beverage flavoring feature.
Figure 9:
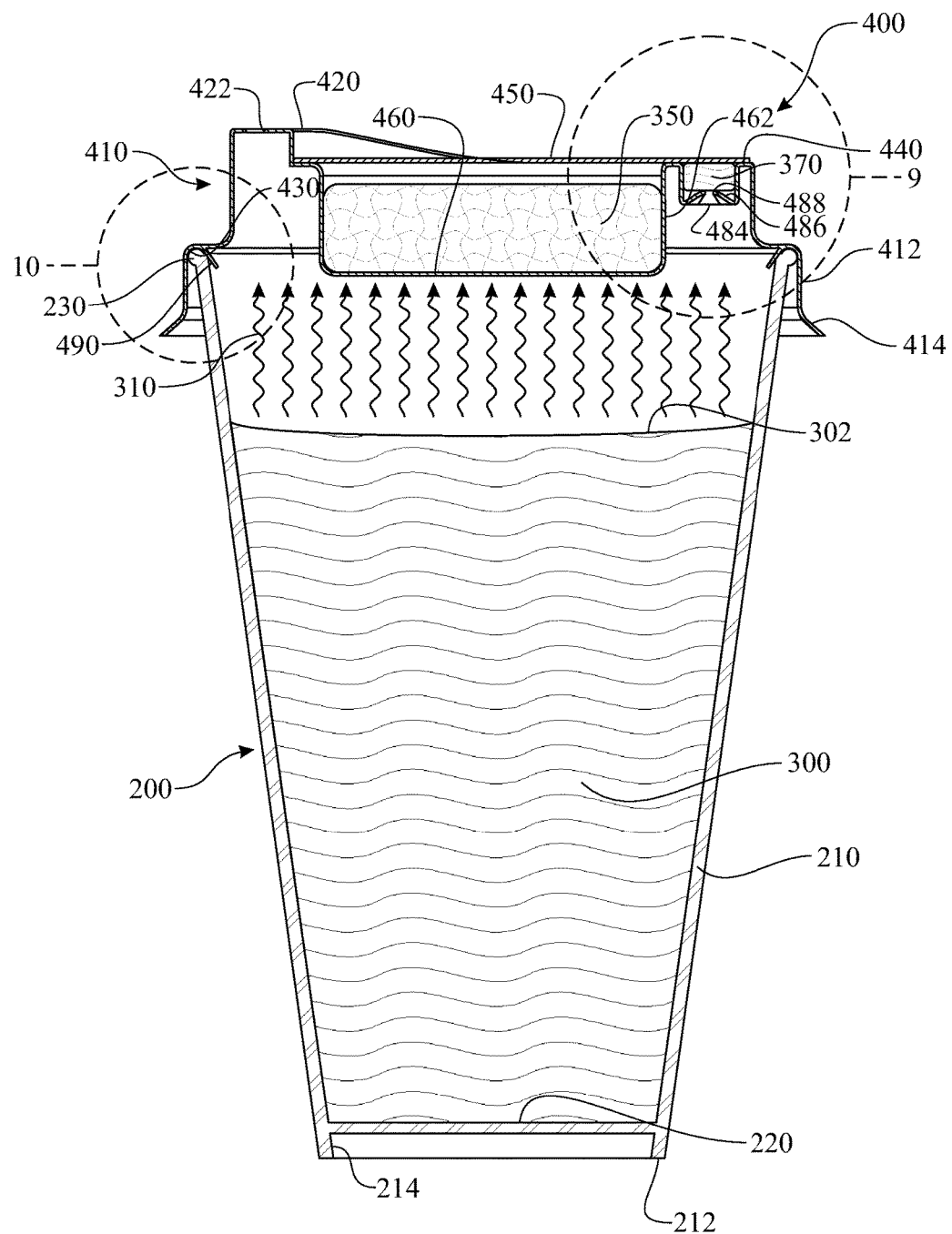
FIG. 9 presents a sectioned side view of the consumer's snack experience enhancing lid attached to a beverage container originally introduced in FIG. 8, introducing a snack packaged within a snack receiving receptacle and a beverage flavoring capsule packaged within a beverage flavoring capsule receiving receptacle, the condiments being shown in a contained configuration.
Figure 10:
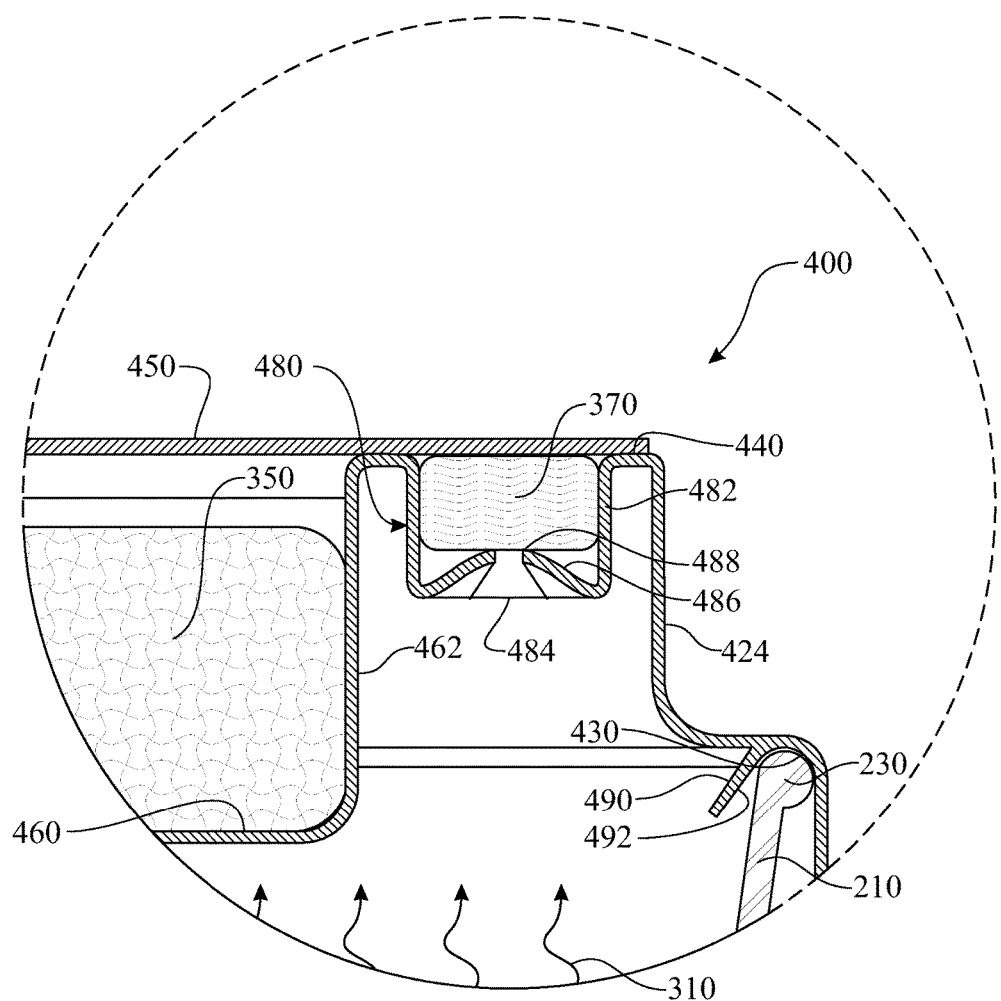
FIG. 10 presents a magnified section view detailing a beverage flavoring dispenser and other related features of the consumer's snack experience enhancing lid.

The detailed section presented in FIGS. 5 and 7 also introduces an importance of the beverage lid riser wall 124. The beverage lid riser wall 124 elevates the snack receiving receptacle base panel 160 of the snack receiving receptacle above the beverage container rim retention feature 130; thus ensuring the snack receiving receptacle base panel 160 is located above the beverage upper surface 302.

It is understood that the snack containing lid assembly 110 can include features to identify what snack is packaged within the snack receiving receptacle. The snack identifying features can include a boss (similar to beverage type identifiers currently formed within currently available beverage container lids; a label; printing, coloring, or another identifier provided by the snack receptacle cover 150; and the like.

A snack containing cup assembly 400 introduces a snack containing lid assembly 410 for inclusion of at least one beverage flavoring tablet 370, as illustrated in FIGS. 8 through 11. The snack containing lid assembly 410 is an enhanced version of the snack containing lid assembly 110, introducing additional or alternative features. Like features of the snack containing lid assembly 110 and the snack containing lid assembly 410 are numbered the same except preceded by the numeral '4'. The snack containing lid assembly 410 introduces a beverage flavoring capsule receptacle 480 and a rim anti-leak flange 490.

The beverage flavoring capsule receptacle 480 is formed as a recession within the beverage covering segment, and preferably within a snack cover receiving ledge 440. The beverage flavoring capsule receptacle 480 includes a beverage flavoring capsule receptacle side wall 482 extending upward or generally axially from a circumferential edge of a beverage flavoring capsule receptacle base panel 481, terminating at the snack cover receiving ledge 440. This exemplary configuration enables multi-use of a snack cover 450, wherein the snack cover 450 retains the snack 350 within the snack receiving receptacle and retains a beverage flavoring tablet 370 within the beverage flavoring capsule receptacle 480.

The snack cover 450 covers each of the at least one beverage flavoring capsule receptacles 480. The snack cover 450 can include a snack cover retention tab 453. The snack cover retention tab 453 would be adhesively assembled to the snack containing lid assembly 410, thus retaining the snack cover 450 to the snack containing lid assembly 410 while enabling access to the snack 350 from the snack receiving receptacle.

The beverage flavoring tablet 370 can encase any desired flavoring composition. Examples of available flavors include: a sweetener, vanilla, French vanilla, cinnamon, hazel nut, chocolate, cream, Irish cream, mint, pumpkin, spice, peppermint, caramel, butterscotch, Kaluha, Amaretto, rum, marshmallow, flavored rum, toffee, almond, and the like. The beverage flavoring can additionally of a composition that is sugar free. A series of flavoring identifiers can be included upon the snack cover 450. Examples include a vanilla flavoring indicator 456, a cinnamon flavoring indicator 457, and a chocolate flavoring indicator 458. It is understood that the flavoring identifiers would be any flavoring identifier associated with any flavor. The flavoring identifiers can be pre-printed upon the snack cover 450, hand written upon the snack cover 450, provided as a series of indicators that can be marked accordingly, labels provided after selection and insertion of the specific desired flavoring capsule 370, and the like.

The beverage flavoring capsule receptacle 480 can include features for retention of the beverage flavoring tablet 370 and dispersion of a beverage flavoring composition from within the beverage flavoring tablet 370 into the beverage 300. A beverage flavoring capsule piercing element 486 is located within the beverage flavoring capsule receptacle 480. The beverage flavoring capsule piercing element 486 can be of any suitable shape and configuration to pierce the capsule of the beverage flavoring tablet 370. The exemplary embodiment introduces a beverage flavoring capsule piercing element 486 having a conical shape defining a beverage flavoring capsule piercing tip 488. A beverage flavoring composition dispensing orifice 484 can be centrally located passing through the beverage flavoring capsule piercing element 486. Alternatively, the beverage flavoring composition dispensing orifice 484 can be located between the beverage flavoring capsule piercing element 486 and the beverage flavoring capsule receptacle side wall 482, wherein the liquid flavoring composition carried within the beverage flavoring tablet 370 would be directed down the beverage flavoring capsule piercing element 486 towards and through each of at least one beverage flavoring composition dispensing orifice 484. The liquid flavoring composition would then be dispensed into the beverage 300. The snack cover 450 can be of a flexible material, wherein the consumer would apply pressure to the snack cover 450 in an area over the beverage flavoring capsule receptacle 480. The applied pressure is transferred to the beverage flavoring tablet 370. The beverage flavoring tablet 370 is compressed against the beverage flavoring capsule piercing tip 488. The beverage flavoring capsule piercing tip 488 punctures the capsule material of the beverage flavoring tablet 370, dispensing the flavoring composition carried within the beverage flavoring tablet 370. The flavoring composition flows through the beverage flavoring composition dispensing orifice 484 and into the contained volume of the beverage 300.

The snack containing lid assembly 410 can include a plurality of beverage flavoring capsule receptacles 480. Each beverage flavoring capsule receptacle 480 would contain a beverage flavoring tablet 370, wherein all of the beverage flavoring tablet 370 of the series of beverage flavoring tablets 370 can be the same flavoring or each of beverage flavoring tablet 370 of the series of beverage flavoring tablets 370 can be a different flavor.

Figure 11:
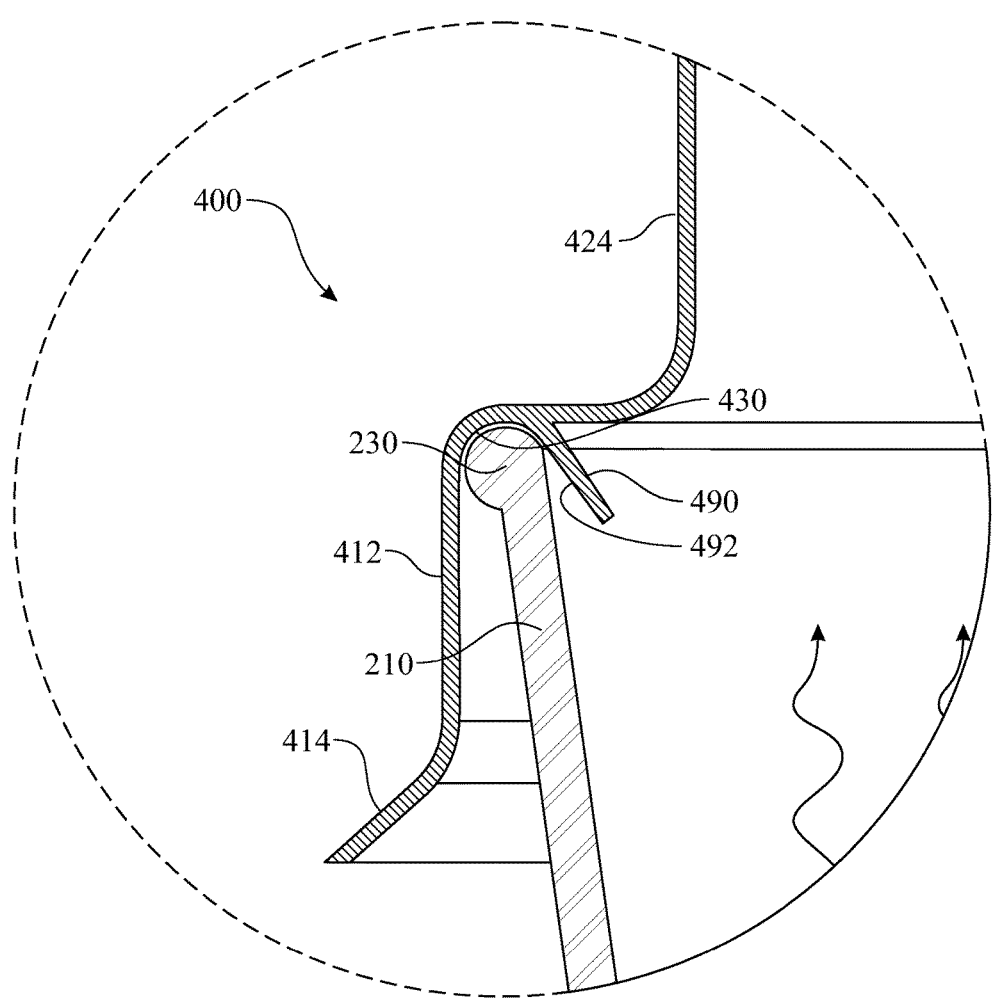
FIG. 11 presents a magnified section view detailing an optional anti-drip feature integrated into the consumer's snack experience enhancing lid.
Figure 12:
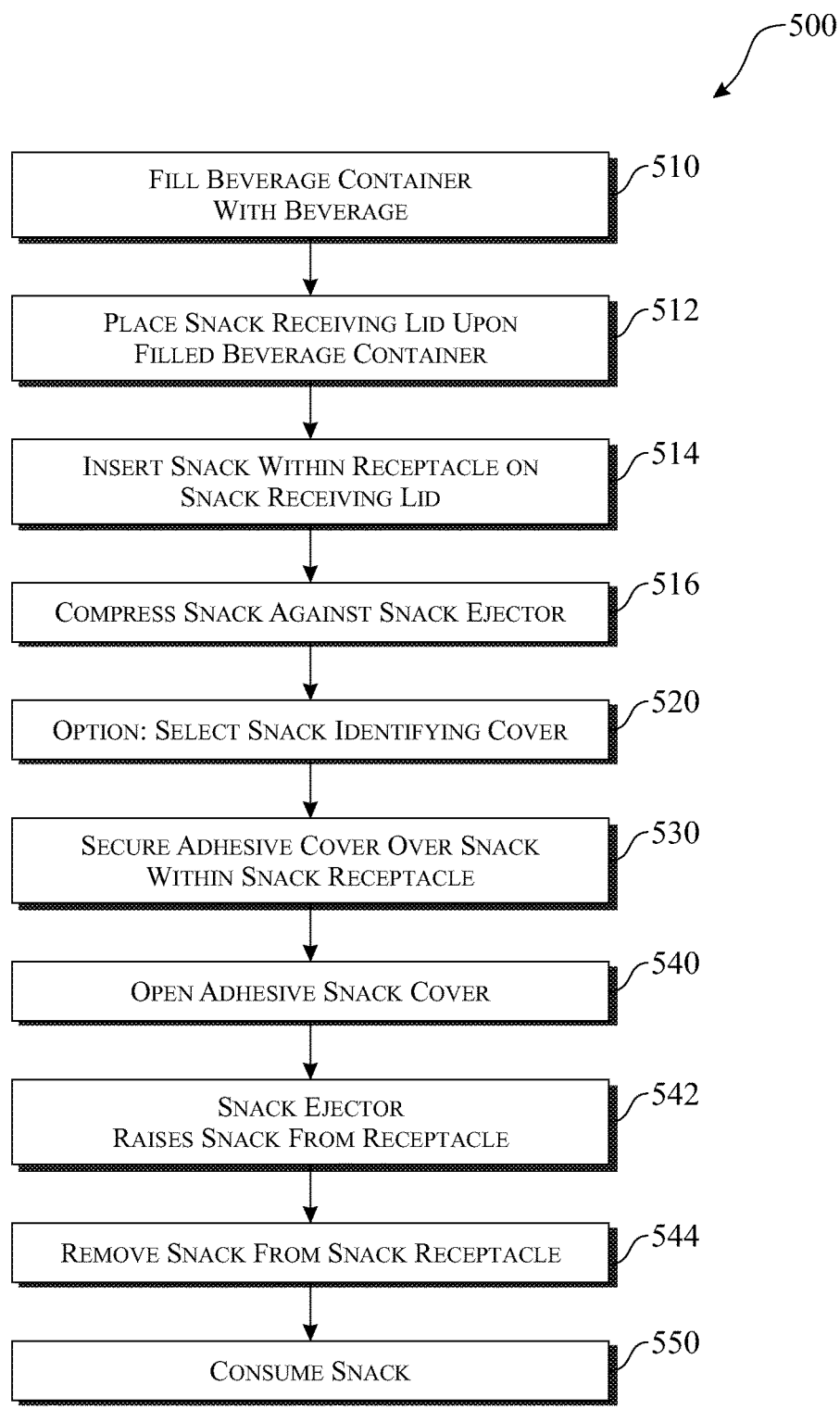
FIG. 12 presents an exemplary flow diagram describing a process of using the consumer's snack experience enhancing lid for packaging, distributing, and presenting the snack from within a snack receiving receptacle.
Figure 13:
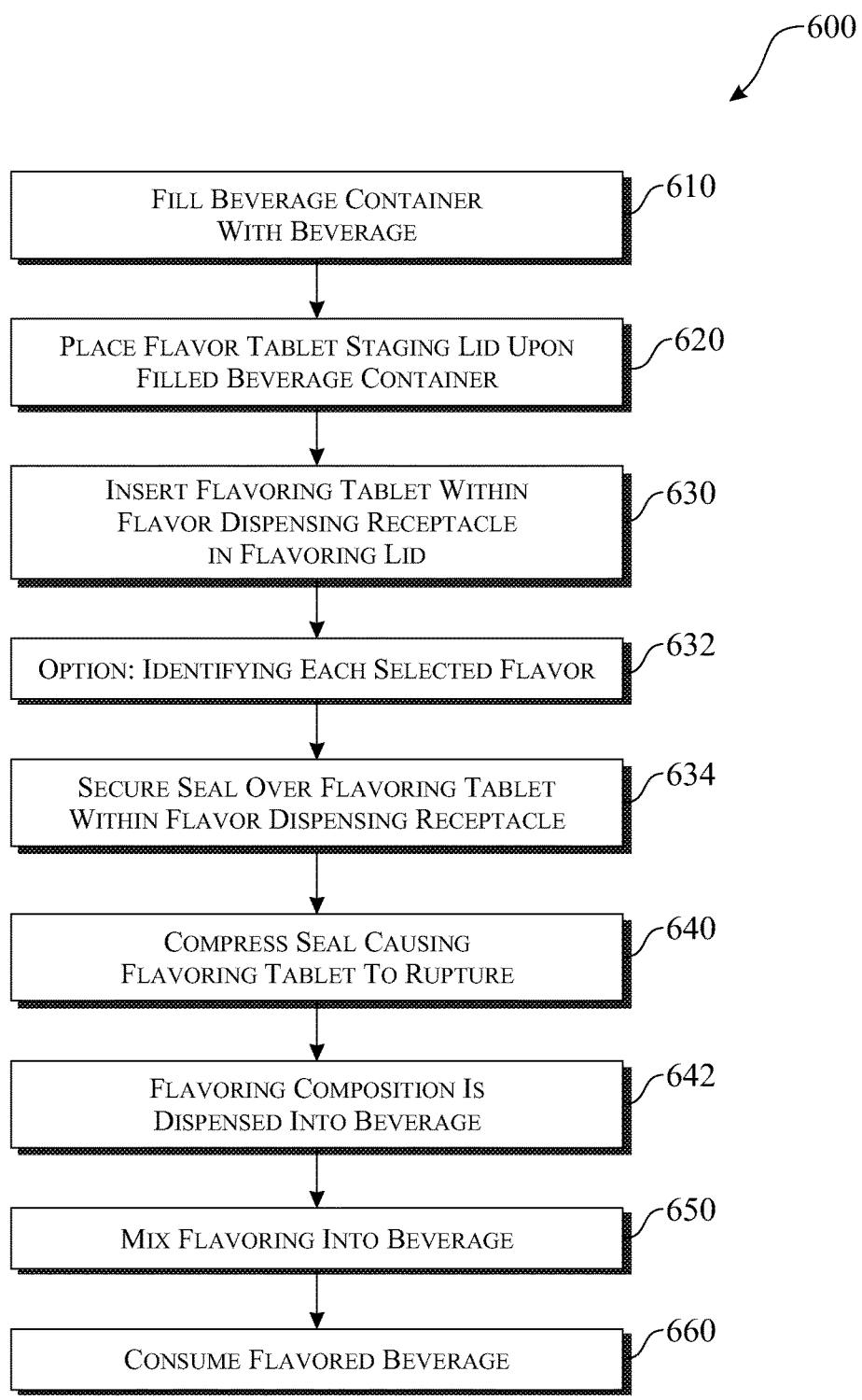
FIG. 13 presents an exemplary flow diagram describing a process of using the consumer's snack experience enhancing lid for packaging, distributing, and dispending flavoring from the beverage flavoring capsule from within a snack receiving receptacle.

A rim anti-leak flange 490 extends axially and inward from an interior edge of a beverage container rim retention feature 430, as best shown in FIG. 11. The rim anti-leak flange 490 provides several benefits. The rim anti-leak flange 490 reduces or eliminates passage of fluid between the beverage cup rolled upper rim 230 and the beverage container rim retention feature 430. The rim anti-leak flange 490 enhances the structural rigidity of the snack containing lid assembly 410 about the beverage container rim retention feature 430. A rim anti-leak surface 492 of the rim anti-leak flange 490 aids in guiding and seating the beverage cup rolled upper rim 230 into the beverage container rim retention feature 430. The rim anti-leak flange 490 additionally aids in retaining the beverage cup rolled upper rim 230 within the beverage container rim retention feature 430, which retains the beverage cup sidewall 210 in the proper conical frustum shape.

A summary of a series of steps for using the snack containing cup assembly 100 is presented in an exemplary snack packaged beverage lid usage flow diagram 500. The process initiates by obtaining a beverage cup 200 and a respective snack containing lid assembly 110. The service person would pour or dispense a beverage 300 into the beverage receptacle 240 of the beverage cup 200 (block 510). Once the beverage cup 200 is filled with a sufficient volume of the selected beverage 300, the service person would place the snack containing lid assembly 110 onto the filled beverage cup 200 (block 512). The service person then inserts a selected snack 350 into the snack receiving receptacle (block 514). The service person applies a pressure or downward force onto the inserted snack 350, compressing the snack 350 against the snack ejector feature 170 (block 516). The service person can optionally identify the type of selected snack 350 that has been inserted into the snack receiving receptacle (block 520). This can be accomplished in accordance with any suitable process. The snack receptacle cover 150 can be used to identify the selected and inserted snack 350. The snack receptacle cover 150 can include printing (pre-printed or real time printing), be color coded, include a number of icons that can be marked accordingly, simply inscribing an identification, and the like, or any combination thereof. The snack receptacle cover 150 can be aligned with the snack containing lid assembly 110 in a manner to identify the inserted snack 350. One element can include an identifier; the other element can include a series of offered snacks 350. The snack cover receiving ledge 140 would be rotated to align the identifier on the first element with the associated offered snack 350 from the icons or other indicator of the series of offers snacks 350 on the second element. The snack receptacle cover 150 is then properly oriented and secured to the snack containing lid assembly 110 using any suitable attachment process (block 530). In the exemplary embodiment, the snack receptacle cover 150 is adhesively bonded to the snack cover receiving ledge 140 using the snack cover adhesive 154. The packaged snack containing cup assembly 100 is then ready to be delivered to the consumer. The emitted heat 310 from the beverage 300 can be used to warm the packaged snack 350. The consumer opens the snack receptacle cover 150 when they are ready to consume the snack 350 (block 540). Once the snack receptacle cover 150 is partially opened and releases the compression force from the snack ejector feature 170, the snack ejector feature 170 raises the snack 350 from the snack receiving receptacle (block 542). The consumer removes the snack 350 from the snack receiving receptacle (block 544). The consumer then consumes the snack 350 (block 550). It is noted that the snack cover adhesive 154 can be reusable, enabling the consumer to re-adhere or reseal the snack receptacle cover 150 to the snack cover receiving ledge 140 of the snack containing lid assembly 110.

A summary of a series of steps for using the snack containing cup assembly 400 is presented in an exemplary beverage flavoring capsule packaged beverage lid usage flow diagram 600. The process initiates by obtaining a beverage cup 200 and a respective snack containing lid assembly 410. The service person would pour or dispense a beverage 300 into the beverage receptacle 240 of the beverage cup 200 (block 610). Once the beverage cup 200 is filled with a sufficient volume of the selected beverage 300, the service person would place the snack containing lid assembly 410 onto the filled beverage cup 200 (block 620). The service person then inserts a selected beverage flavoring tablet 370 into each of the at least one beverage flavoring capsule receptacle 480 (block 630).

The service person can optionally identify the type of selected beverage flavoring tablet 370 that has been inserted into each of the at least one beverage flavoring capsule receptacle 480 (block 632). This can be accomplished in accordance with any suitable process. A snack cover 450 can be used to identify each selected and inserted beverage flavoring tablet 370. The snack cover 450 can include printing (pre-printed or real time printing), be color coded, include a number of icons 456, 457, 458, simply inscribing a flavor identification, and the like, or any combination thereof. In another solution, the service person can apply labels to the snack containing lid assembly 410, the snack cover 450, or any other portion of the snack containing cup assembly 400. The snack cover 450 is then properly oriented and secured to the snack containing lid assembly 410 using any suitable attachment process (block 634). In the exemplary embodiment, the snack cover 450 is adhesively bonded to the snack cover receiving ledge 440 using any suitable bonding agent or adhesive (similar to the snack cover adhesive 154). The packaged snack containing cup assembly 400 is then ready to be delivered to the consumer. The consumer applies a compression force or pressure to the region associated with the desired beverage flavoring tablet 370, causing the beverage flavoring tablet 370 to be compressed against the beverage flavoring capsule piercing tip 488, rupturing the beverage flavoring tablet 370 (block 640). The flavoring composition within the compressed beverage flavoring tablet 370 is dispensed into the beverage 300 (block 642). The flavoring composition is mixed into the beverage 300 using any suitable mixing method, such as stirring, shaking, and the like. The consumer then consumes the beverage 300 (block 660).

Although the snack containing lid assembly 410 includes each of the following: a snack receiving receptacle and a beverage flavoring capsule receptacle 480, it is understood that the snack containing lid assembly 410 can be designed excluding the snack receiving receptacle.

It is also understood that the snack receiving receptacle and or at least one beverage flavoring capsule receptacle 480 can be adapted to any beverage lid.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

REFERENCE ELEMENT DESCRIPTIONS

Ref No. Description
- 100 snack containing cup assembly
- 110 snack containing lid assembly
- 112 cup rim receiving sidewall
- 114 lid skirt
- 120 drink dispensing section
- 122 drink dispensing orifice
- 124 beverage lid riser wall
- 130 beverage container rim retention feature
- 140 snack cover receiving ledge
- 150 snack receptacle cover
- 152 snack cover retrieval tab
- 154 snack cover adhesive
- 160 snack receiving receptacle base panel
- 162 snack receiving receptacle sidewall
- 170 snack ejector feature
- 172 snack ejector arm
- 174 snack ejector biasing feature
- 176 snack ejector retraction feature
- 200 beverage cup
- 210 beverage cup sidewall
- 212 beverage cup sidewall base end
- 214 beverage cup sidewall base gap
- 220 beverage cup bottom panel
- 230 beverage cup rolled upper rim
- 240 beverage receptacle
- 242 beverage fill indicator
- 300 beverage
- 302 beverage upper surface
- 310 emitted heat
- 350 snack
- 370 beverage flavoring tablet
- 400 snack containing cup assembly
- 410 snack containing lid assembly
- 412 cup rim receiving sidewall
- 414 lid skirt
- 420 drink dispensing section
- 422 drink dispensing orifice
- 424 beverage lid riser wall
- 430 beverage container rim retention feature
- 440 snack cover receiving ledge
- 450 snack cover
- 453 snack cover retention tab
- 456 vanilla flavoring indicator
- 457 cinnamon flavoring indicator
- 458 chocolate flavoring indicator
- 460 snack receptacle base panel
- 462 snack receptacle sidewall
- 470 snack ejector
- 472 snack ejector biasing feature
- 474 snack ejector retraction feature
- 480 beverage flavoring capsule receptacle
- 481 beverage flavoring capsule receptacle base panel
- 482 beverage flavoring capsule receptacle side wall
- 484 beverage flavoring composition dispensing orifice
- 486 beverage flavoring capsule piercing element
- 488 beverage flavoring capsule piercing tip
- 490 rim anti-leak flange
- 492 rim anti-leak surface
- 500 snack packaged beverage lid usage flow diagram
- 510 beverage dispensing step
- 512 lid installation step
- 514 snack placement step
- 516 compress snack against snack ejector
- 520 optionally identify the packaged snack
- 530 secure snack cover to lid step
- 540 open snack cover step
- 542 snack raised by snack ejector step
- 544 snack removal from snack receptacle step
- 550 consume snack step
- 600 beverage flavoring capsule packaged beverage lid usage flow diagram
- 610 beverage dispensing step
- 620 lid installation step
- 630 insert flavor capsule into dispensing receptacle step
- 632 optionally identify the inserted capsule flavor step
- 634 secure flavor capsule seal cover onto beverage lid step
- 640 compress cover causing flavoring capsule to rupture step
- 642 flavoring composition is dispensed into beverage step
- 650 mix flavoring into beverage step
- 660 consume flavored beverage step

What is claimed is:

1. A method of using a beverage container lid for distributing a snack, the method comprising steps of:
   providing a cup;
   providing a beverage covering segment having a cup rim receiving sidewall extending downward from a peripheral edge of the covering segment, wherein the cup rim receiving sidewall is designed to removeably engage with a rim of a cup;
   including a snack receiving receptacle formed within the beverage covering segment, the snack receiving receptacle comprising a snack receiving base panel, a snack receiving receptacle sidewall extending between a peripheral edge of the snack receiving base panel and the beverage covering segment, and a snack receptacle cover;
   including a snack ejector formed within the snack receiving receptacle;
   including a snack cover receiving ledge formed on the beverage covering segment extending about the snack receiving receptacle;
   placing the snack within a snack receiving receptacle;
   compressing a snack ejecting feature located within the snack receiving receptacle with the snack;
   applying a compression retention force to maintain compression of the snack ejecting feature; and
   retaining the snack within the snack receiving receptacle by detachably securing a snack receptacle cover to the snack cover receiving ledge.

2. The method of using a beverage container lid for distributing a snack as recited in claim 1, wherein the snack ejector feature is at least one of a biasing element and a cantilevered spring,
   wherein the step of compressing a snack ejecting feature located within the snack receiving receptacle is accomplished by compressing the at least one of the biasing member and the cantilevered spring.

3. The method of using a beverage container lid for distributing a snack as recited in claim 1, further comprising a step of creating the snack ejector feature from the snack receiving receptacle.

4. The method of using a beverage container lid for distributing a snack as recited in claim 1,
further comprising a steps of at least partially separating the snack receptacle cover from the beverage container lid;
removing the compression retention force from the snack ejecting feature; and
raising the snack from the snack receiving receptacle, wherein the raising is accomplished by the snack ejecting feature.

5. The method of using a beverage container lid for distributing a snack as recited in claim 1, further comprising steps of:
including a beverage flavoring capsule receptacle formed within the beverage container lid;
placing a beverage flavoring capsule within the beverage flavoring capsule receptacle.

6. The method of using a beverage container lid for distributing a snack as recited in claim 5, further comprising steps of:
applying a force to the beverage flavoring capsule causing the beverage flavoring capsule to fracture; and
dispensing flavoring from within the beverage flavoring capsule from the beverage flavoring capsule receptacle into a beverage contained within the cup.

7. The method of using a beverage container lid for distributing a snack as recited in claim 1, further comprising a step of:
dispensing a hot beverage into the cup; and
warming the snack by placing the beverage container lid onto the cup comprising the hot beverage.

8. The method of using a beverage container lid for distributing a snack as recited in claim 1, further comprising a step of:
elevating the snack to a location above an anticipated beverage upper surface of a beverage when the beverage is dispensed into the cup by adapting a snack receptacle base panel of the snack receiving receptacle to the location accordingly when the beverage container lid is secured to the cup.

9. The method of using a beverage container lid for distributing a snack as recited in claim 1, further comprising a step of:
providing a drink dispensing orifice through the beverage covering segment of the beverage container lid.

10. The method of using a beverage container lid for distributing a snack as recited in claim 1, further comprising a step of:
identifying the snack stored within the snack receiving container.

11. The method of using a beverage container lid for distributing a snack as recited in claim 1, further comprising a step of:
identifying the snack stored within the snack receiving container, wherein the identification is provided by one of a press in boss, a removable label, a marking, rotating an indicator on the snack receptacle cover to align with an associated marking on the lid.

12. A method of using a beverage container lid for distributing and dispensing a snack, the method comprising steps of:
placing the snack within a snack receiving receptacle;
compressing a snack ejecting feature located within the snack receiving receptacle with the snack;
applying a compression retention force to maintain compression of the snack ejecting feature; and
retaining a snack receptacle cover to the beverage container lid by detachably securing a snack receptacle cover to the snack cover receiving ledge.

13. The method of using a beverage container lid for distributing a snack as recited in claim 12, wherein the snack ejector feature is at least one of a biasing element and a cantilevered spring,
wherein the step of compressing a snack ejecting feature located within the snack receiving receptacle is accomplished by compressing the at least one of the biasing member and the cantilevered spring.

14. The method of using a beverage container lid for distributing a snack as recited in claim 12, further comprising a step of creating the snack ejector feature from the snack receiving receptacle.

15. The method of using a beverage container lid for distributing a snack as recited in claim 12, wherein the step of sealing the snack within the snack receiving receptacle with a snack receptacle cover is accomplished by securing the snack receptacle cover to the beverage container lid,
further comprising a step of at least partially separating the snack receptacle cover from the beverage container lid;
removing the compression retention force from the snack ejecting feature; and
raising the snack from the snack receiving receptacle, wherein the raising is accomplished by the snack ejecting feature.

16. The method of using a beverage container lid for distributing a snack as recited in claim 12, further comprising steps of:
placing a beverage flavoring capsule within the beverage flavoring capsule receptacle.

17. The method of using a beverage container lid for distributing a snack as recited in claim 16, further comprising steps of:
including a beverage flavoring capsule receptacle formed within the beverage container lid;
applying a force to the beverage flavoring capsule causing the beverage flavoring capsule to fracture; and
dispensing flavoring from within the beverage flavoring capsule from the beverage flavoring capsule receptacle into a beverage contained within the cup.

18. The method of using a beverage container lid for distributing a snack as recited in claim 12, further comprising steps of:
dispensing a hot beverage into the cup; and
warming the snack by placing the beverage container lid onto the cup comprising the hot beverage.

19. The method of using a beverage container lid for distributing a snack as recited in claim 12, further comprising a step of:
identifying the snack stored within the snack receiving container.

* * * * *